US011575650B2

(12) United States Patent
Tsukada et al.

(10) Patent No.: US 11,575,650 B2
(45) Date of Patent: Feb. 7, 2023

(54) INFORMATION PROCESSING DEVICE, ADDRESS DUPLICATION MANAGING METHOD, AND NON-TRANSITORY COMPUTER READABLE STORAGE MEDIUM

(71) Applicant: Yokogawa Electric Corporation, Musashino (JP)

(72) Inventors: Kento Tsukada, Tokyo (JP); Masanobu Tsuchiya, Tokyo (JP)

(73) Assignee: YOKOGAWA ELECTRIC CORPORATION, Musashino (JP)

( * ) Notice: Subject to any disclaimer, the term of this patent is extended or adjusted under 35 U.S.C. 154(b) by 16 days.

(21) Appl. No.: 17/096,374

(22) Filed: Nov. 12, 2020

(65) Prior Publication Data

US 2021/0152514 A1 May 20, 2021

(30) Foreign Application Priority Data

Nov. 20, 2019 (JP) .............................. JP2019-209491

(51) Int. Cl.
*H04L 29/12* (2006.01)
*H04L 61/5046* (2022.01)

(52) U.S. Cl.
CPC ................................ *H04L 61/5046* (2022.05)

(58) Field of Classification Search
CPC .......................... H04L 61/2046; H04L 61/5046
See application file for complete search history.

(56) References Cited

U.S. PATENT DOCUMENTS

| 10,103,995 | B1 * | 10/2018 | Baveja | H04L 63/101 |
| 10,382,401 | B1 * | 8/2019 | Lee | H04L 63/166 |
| 2010/0174811 | A1 * | 7/2010 | Musiri | H04L 63/0272 709/223 |
| 2010/0257269 | A1 * | 10/2010 | Clark | G06F 9/4856 718/1 |
| 2012/0063458 | A1 * | 3/2012 | Klink | H04L 61/2517 370/392 |
| 2015/0095505 | A1 * | 4/2015 | Antony | H04L 61/5046 709/228 |
| 2015/0128245 | A1 * | 5/2015 | Brown | H04L 63/0245 709/238 |
| 2015/0205280 | A1 | 7/2015 | Tsuchiya et al. | |
| 2016/0080317 | A1 * | 3/2016 | Brandwine | H04L 67/565 709/245 |

FOREIGN PATENT DOCUMENTS

| JP | 2001-230789 A | 8/2001 |
| JP | 2015-138292 A | 7/2015 |

\* cited by examiner

*Primary Examiner* — Christopher B Robinson
(74) *Attorney, Agent, or Firm* — WHDA, LLP

(57) ABSTRACT

An information processing device includes a virtualizer configured to operate as a proxy of hardware on the hardware, at least one virtual machine configured to function as a part of a process control system on the virtualizer, an address duplication determiner configured to determine duplication of an address on an external network when the external network is connected to the hardware, and an address duplication manager configured to cut a connection between the virtual machine and the external network when the duplication of the address is detected.

20 Claims, 10 Drawing Sheets

| IP ADDRESS | ASSIGNMENT INFORMATION |
|---|---|
| XXX | ASSIGNED |
| YYY | ASSIGNED |
| ... | ... |
| AAA | UNASSIGNED |
| BBB | UNASSIGNED |

FIG. 11

| ID (VIRTUAL MACHINE NAME) | IP ADDRESS | ASSIGNMENT INFORMATION |
|---|---|---|
| VM1 | XXX | ASSIGNED |
| VM2 | YYY | ASSIGNED |
| ... | ... | ... |
| - | AAA | UNASSIGNED |
| - | BBB | UNASSIGNED |

# INFORMATION PROCESSING DEVICE, ADDRESS DUPLICATION MANAGING METHOD, AND NON-TRANSITORY COMPUTER READABLE STORAGE MEDIUM

BACKGROUND

Field of the Invention

The present invention relates to an information processing device, an address duplication managing method, and a non-transitory computer readable storage medium.

Priority is claimed on Japanese Patent Application No. 2019-209491, filed on Nov. 20, 2019, the contents of which are incorporated herein by reference.

Description of Related Art

In the related art, process control systems that control various kinds of state amounts (for example, pressures, temperatures, flow rates, and the like) in industrial processes have been constructed and advanced automated operations have been realized in plants and factories (hereinafter referred to simply as "plants" when referred to in general). Specifically, controllers (process control devices) which are cores of the process control systems control the above-described state amounts by acquiring detection results of a plurality of sensors (flowmeters, thermometers, and the like), obtaining operation amounts of actuators (valves or the like) in accordance with the detection results, and operating actuators in accordance with the operation amounts. In addition, monitoring devices monitor plant or industrial process states.

In recent years, examples in which controllers, monitoring devices, or the like are mounted as applications on virtualization servers using virtualization technologies in the process control systems have increased (for example, Japanese Unexamined Patent Application Publication No. 2015-138292). When virtualization servers realizing virtualization technologies are connected to networks, it is necessary to check whether Internet Protocol (IP) addresses assigned to virtual machines and IP addresses assigned to devices located in external networks are duplicated. In the related art, when the duplication of the IP addresses is checked, duplication of Internet Protocol version 4 (IPv4) addresses is checked in conformity with the address resolution protocol (ARP).

However, countermeasures taken by the technology of the related art are effective when a single network device extends to a network, but are not effective when a virtualization server or the like newly extends to an existing network (hereinafter referred to as a "virtualization server"). This is because when the virtualization server is connected to the existing network, an IP address has already been assigned to an internal virtual machine of the virtual server and duplication of the IP address is not checked in the technology of the related art. When an address is duplicated in a control device of a process control system, output omission, output duplication, or contradiction occurs, and thus large damage may arise in a control target. Accordingly, it is necessary to take stricter countermeasures against a duplication address problem than in general IT technology.

SUMMARY

An information processing device may include a virtualizer configured to operate as a proxy of hardware on the hardware; at least one virtual machine configured to function as a part of a process control system on the virtualizer; an address duplication determiner configured to determine duplication of an address on an external network when the external network is connected to the hardware; and an address duplication manager configured to cut a connection between the virtual machine and the external network when the duplication of the address is detected.

Further features and aspects of the present disclosure will become apparent from the following detailed description of exemplary embodiments with reference to the attached drawings.

BRIEF DESCRIPTION OF THE DRAWINGS

FIG. 5 is a diagram illustrating a system configuration of a process control system according to a third embodiment.

FIG. 8 is a diagram illustrating an example of an address table according to the fourth embodiment.

FIG. 11 is a diagram illustrating an example of an address table according to the fifth embodiment.

DETAILED DESCRIPTION OF THE EMBODIMENTS

Figure 1:
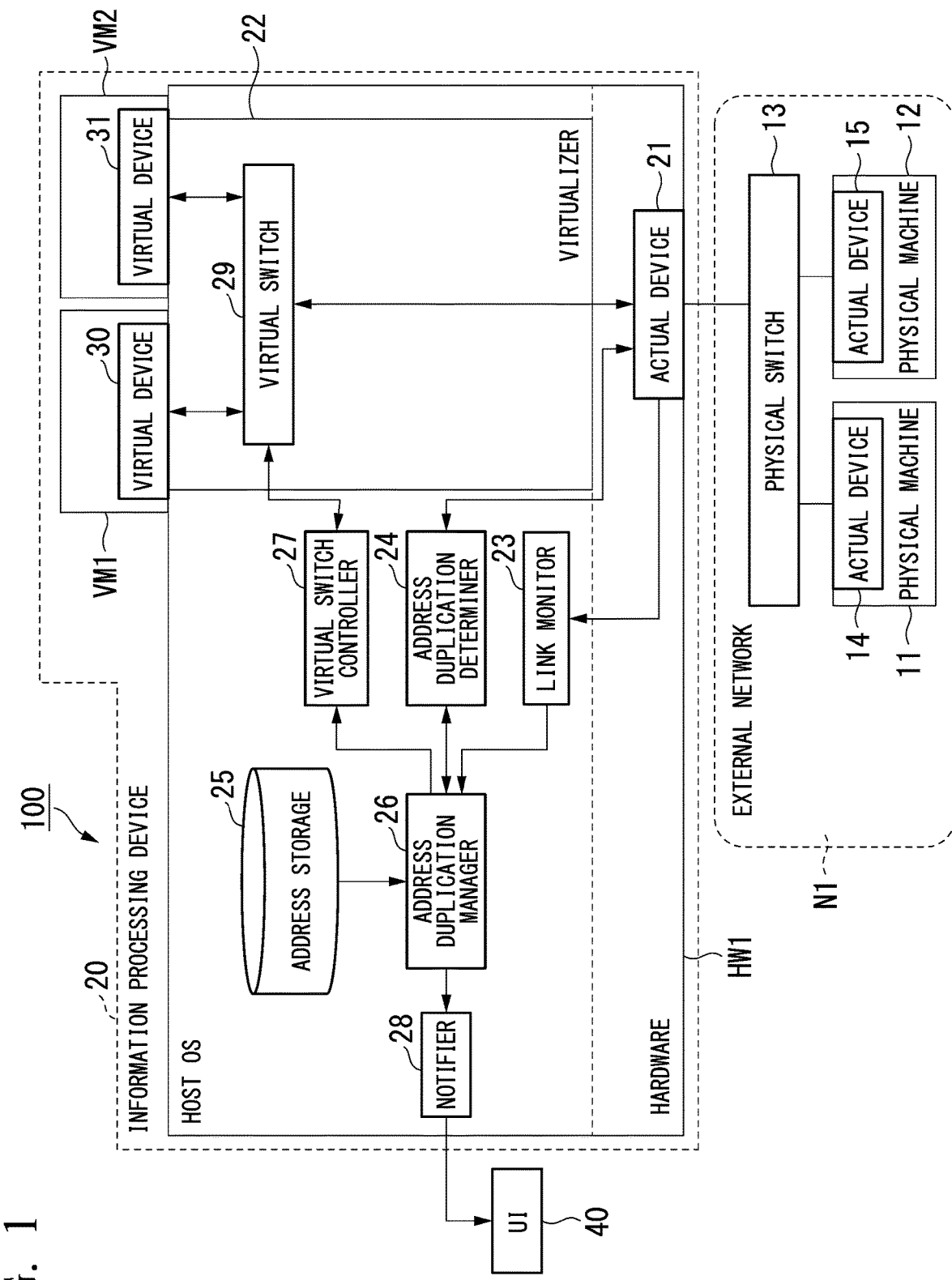
FIG. 1 is a diagram illustrating a system configuration of a process control system according to a first embodiment.

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of the present invention is to provide a technology capable of reducing an influence of address duplication which can occur when a virtualization server is connected to an existing network.

Hereinafter, an embodiment of the present invention will be described with reference to the drawings.

(Overview)

According to the embodiment of the present invention, it is possible to reduce an influence of address duplication which can occur when a virtualization server is connected to an existing network. In the related art, as a technology for detecting address duplication, there is a technology for checking IPv4 address duplication in conformity with the ARP protocol. This scheme is a scheme of designating an IP address of an own device in a portion describing a destination IP (a target IP) in a packet of an ARP request and broadcasting the packet. A side receiving the packet responds to a packet transmission source with an ARP reply when the target IP in the packet is identical to the own IP address. The side responds with nothing when the target IP in the packet is not identical to the own IP address.

In the foregoing exchange, a network device that desires to examine duplication of its IP address determines that the IP address is duplicated when an ARP reply is returned, and determines that the IP address is not duplicated when the ARP reply is not returned. This checking is performed when a certain device is connected to a network or an IP address of the device is determined.

However, in the technology of the related art, countermeasures against a problem of address duplication have not been taken. Countermeasures taken using the ARP of the technology of the related art are effective when a single network device extends to a network, but are not effective when a virtualization server on which a virtual machine where an IP address has already been set is mounted is connected to an existing network. The following two reasons can be exemplified. The first reason is that the address duplication is not checked in connection between existing networks because a timing at which the duplication is checked in accordance with the technology of the related art is a time at which the single network device is connected to the network. The second reason is that the extension of the virtualization server to the existing network is considered to be "connection of an imaginary switch (a virtual switch) inside the virtualization server to the existing network" and this connection is equivalent to connection between existing networks. In addition, when networks are connected to each other, an IP address has already been assigned to a device belonging to each network, and thus countermeasures against the duplication have not been taken even when address duplication can be detected by checking the duplication immediately after the connection in accordance with the technology of the related art. The same applies to a case in which a virtualization server extends to an existing network.

As described above, it is necessary to take countermeasures against the address duplication when a virtualization server is connected to an existing network.

In the related art, an influence of address duplication caused by a mistake of a worker cannot be prevented in some cases. To guarantee that the address duplication does not occur, it is necessary to connect a virtualization server to an existing network after all the virtual machines are stopped. However, to a worker, a virtualization server appears to be one information processing device and a virtual switch is inside the virtualization server, and thus it is difficult to recognize the presence of the virtual machine. Therefore, it is easy for a worker to make a mistake of erroneously connecting a virtual machine to an existing network without stopping the virtual machine. Such a situation easily arises as follows:

in a case where a virtualization server used in another system is transferred; and in a case where a person in charge of working of an existing network and a person in charge of working of a virtualization server are separate and the latter does not ascertain the existing network in detail.

In the embodiment of the present invention, duplication of an IP address of a virtual machine is determined when hardware is connected to an existing network. When the IP address is determined to be duplicated as a result of the determination of the duplication of the IP address, connection between an external network and a virtual machine in the virtualization server is cut. Thus, no communication with the outside is made when the IP address is duplicated. Therefore, it is possible to reduce an influence of address duplication occurring when the virtualization server is connected to the existing network.

First Embodiment

FIG. 1 is a diagram illustrating a system configuration of a process control system 100 according to a first embodiment. The process control system 100 includes a physical machine 11, a physical machine 12, a physical switch 13, an information processing device 20, and a UI 40. The physical machine 11, the physical machine 12, and the physical switch 13 belong to an external network N1. The information processing device 20 and the external network N1 are connected through the physical switch 13.

The physical machines 11 and 12 are, for example, sensor devices such as flowmeters or temperature sensors, valve devices such as flow control valves or on-off devices, actuator devices such as fans or motors, or device installed in the fields of other plants. The physical machine 11 includes an actual device 14. The physical machine 12 includes an actual device 15. The actual devices 14 and 15 are communication devices such as network interface cards (NICs). The actual devices 14 and 15 are each connected to the physical switch 13.

The physical switch 13 is a physical switch that relays communication between the physical machine 11 and the information processing device 20 and communication between the physical machine 12 and the information processing device 20.

In the information processing device 20, a virtual machine that functions as a part of the process control system, such as a process control device or a monitoring device used to control an industrial process, operates. The information processing device 20 includes hardware HW1 that includes a micro-processing unit (MPU: microprocessor) and a memory. A function of the information processing device 20 is realized by causing the hardware HW1 to execute an installed program. An actual device 21 in FIG. 1 is a communication device such as an NIC. The actual device 21 is connected to an external network N1.

Here, in the information processing device 20, a program that realizes a virtualizer 22 and programs that realize functional units of a link monitor 23, an address duplication determiner 24, an address storage 25, an address duplication manager 26, a virtual switch controller 27, and a notifier 28 are installed. The functions realized by the programs are functions fixedly embedded in the information processing device 20. The programs are executed on a host OS. The virtualizer 22 operates as a proxy of the hardware HW1 on the hardware HW1. The virtualizer 22 causes the virtual switch 29 to associate the actual device 21 with the virtual devices 30 and 31 so that the virtual machines VM1 and VM2 can operate in parallel.

The virtual machine VM1 is virtual hardware. The virtual machine VM1 includes a virtual device 30 connected to the virtual switch 29. The virtual machine VM2 is virtual hardware. The virtual machine VM2 includes a virtual device 31 connected to the virtual switch 29. That is, the above-described virtualizer 22 manages the virtual machines VM1 and VM2 that operate virtually as a proxy of the hardware HW1.

Next, operations of the functional units of the link monitor 23, the address duplication determiner 24, the address storage 25, the address duplication manager 26, the virtual switch controller 27, and the notifier 28 will be described.

The link monitor 23 monitors connection to the actual device 21.

The address duplication determiner 24 performs an address duplication determination process. The address duplication determination process is a process of determining whether an IP address is duplicated. For example, the address duplication determiner 24 determines IP address duplication in conformity with the ARP protocol.

The address storage 25 stores information regarding addresses as a table (an address table). IP addresses assigned to at least the virtual machines VM (for example, the virtual machines VM1 and VM2) are registered in the address table.

Figure 2:
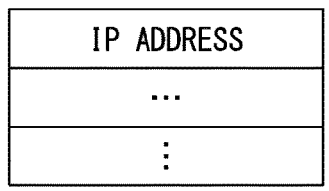
FIG. 2 is a diagram illustrating an example of an address table according to the first embodiment.

FIG. 2 is a diagram illustrating an example of the address table according to the first embodiment. As illustrated in FIG. 2, IP addresses assigned to the virtual machines VM (for example, the virtual machines VM1 and VM2) are registered in the address table according to the first embodiment. In the first embodiment, IP addresses are manually registered in the address table.

Referring back to FIG. 1, the description of the information processing device 20 will continue.

The address duplication manager 26 manages duplication of IP addresses. Specifically, when the address duplication determiner 24 finds duplication of an IP address, the address duplication manager 26 instructs the virtual switch controller 27 to cut a communication path between the actual device 21 and the virtual switch 29 (hereinafter referred to as a "virtual switch communication path"). When the address duplication determiner 24 does not find duplication of an IP address, the address duplication manager 26 instructs the virtual switch controller 27 to release the blocking of the virtual switch communication path. That is, when the address duplication determiner 24 does not find duplication of an IP address, the address duplication manager 26 instructs the virtual switch controller 27 to connect the virtual switch communication path. In the present specification, as a term of the releasing of the connection, the blocking is used as an example of cutting of communication. That is, in the present specification, the blocking is used as one of the schemes of cutting communication. As another scheme of cutting communication, there is filtering.

The virtual switch controller 27 controls the virtual switch in accordance with an instruction from the address duplication manager 26 such that a virtual switch communication path is connected or blocked. The blocking of communication can be performed on the virtual switch 29, the virtual devices 30 and 31 in the virtual machine VM, and a virtual switch communication path. Therefore, the blocking is not limited to the virtual switch communication path, but may be performed on the virtual devices 30 and 31 or the virtual switch 29.

When duplication of an IP address is found, the notifier 28 notifies the UI 40 that the duplication of the IP address is found.

The UI 40 is a user interface with which a worker, an administrator, or the like monitors a state of the information processing device 20. For example, the UI 40 is a display device that displays information from the information processing device 20. Specifically, the UI 40 displays presence of a duplicated IP address, that is, information regarding the duplicated IP address.

Figure 3:
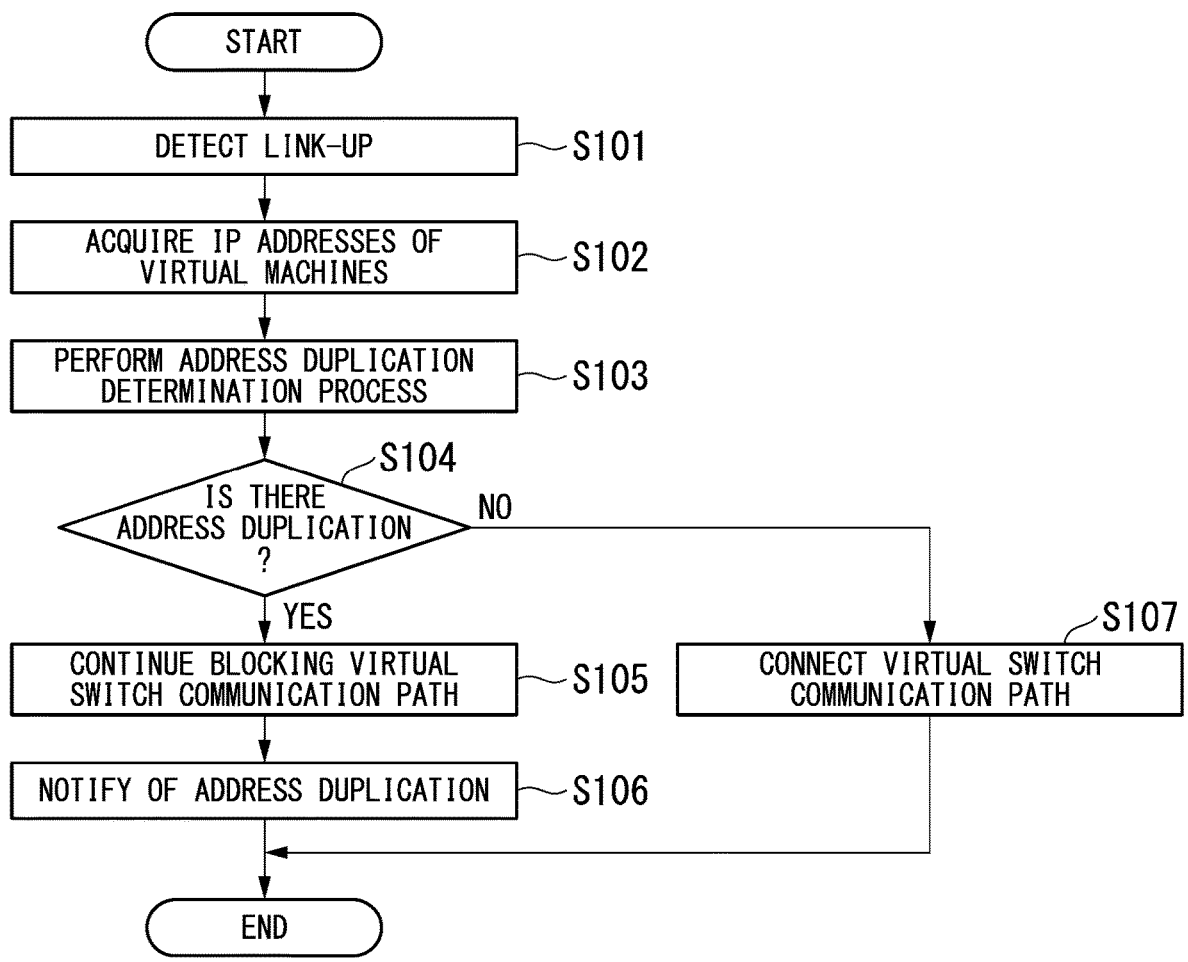
FIG. 3 is a flowchart illustrating a flow of a process of an information processing device according to the first embodiment.

FIG. 3 is a flowchart illustrating a flow of a process of the information processing device 20 according to the first embodiment. When the process of FIG. 3 starts, it is assumed that the actual device 21 is in a link-down state and the virtual switch controller 27 blocks the virtual switch communication path.

When the actual device 21 is connected to the external network N1, the link monitor 23 detects link-up (step S101). The link monitor 23 outputs detection of the link-up to the address duplication manager 26. When the address duplication manager 26 receives a link-up notification output from the link monitor 23, the address duplication manager 26 acquires all the IP addresses stored in the address storage 25 from the address storage 25 (step S102).

The address duplication manager 26 instructs the address duplication determiner 24 to determine duplication of all the acquired IP addresses. The address duplication determiner 24 performs an address duplication determination process on all the IP address in response to the instruction from the address duplication manager 26 (step S103). Specifically, the address duplication determiner 24 designates one IP address in a target IP among the acquired IP addresses and broadcasts an ARP request packet to the external network N1 through the actual device 21. Therefore, to perform the address duplication determination process on all the IP addresses, it is necessary for the address duplication determiner 24 to broadcast the number of ARP request packets a number of times corresponding to the number of IP addresses to the external network N1.

When there is a reply to the ARP request, the address duplication determiner 24 determines that there is the duplication of the IP address. In this case, the IP address assigned to one of the virtual machines VM1 and VM2 is duplicated with the IP address assigned to one of the physical machines 11 and 12 belonging to the external network N1. Then, the address duplication determiner 24 notifies the address duplication manager 26 that the IP addresses are duplicated with each other.

Conversely, when there is no reply to the ARP request during a timeout period set in advance pre-decided immediately after the broadcasting of the ARP request packet, the address duplication determiner 24 determines that there is no duplication of the IP address. The value of the timeout period is retained in the address duplication manager 26 and a worker can set the value of the timeout period through the UI 40. In this case, the IP address assigned to one of the virtual machines VM1 and VM2 is not duplicated with the IP address assigned to one of the physical machines 11 and 12 belonging to the external network N1. Then, the address duplication determiner 24 notifies the address duplication manager 26 that the IP address is not duplicated.

The address duplication manager 26 is notified of information regarding whether the IP address is duplicated by the address duplication determiner 24 (step S104).

When there is the duplication of the IP address (YES in step S104), the address duplication manager 26 performs nothing and continues blocking the virtual switch communication path (step S105). Thereafter, the address duplication manager 26 notifies the UI 40 that there is the duplication of the IP address through the notifier 28 (step S106).

Conversely, when there is no duplication of the IP address (NO in step S104), the address duplication manager 26 connects the virtual switch communication path through the virtual switch controller 27 (step S107).

The process control system 100 that has the above-described configuration determines the duplication of the IP addresses of the virtual machines when a network is newly connected to hardware. When the IP address is determined to be duplicated as a result of the determination of the duplication of the IP address, connection between an external network and a virtual machine in the virtualization server is cut. Thus, no communication with the outside is made when there is the duplication of the IP address. Therefore, it is possible to reduce an influence of address duplication which can occur when the virtualization server is connected to the existing network.

When a worker connects the information processing device 20 to an existing network and the IP address of a physical machine belonging to the existing network is duplicated with the IP address of the virtual machine VM, it is possible to reduce an adverse influence of the address duplication because of the cutting of the virtual switch communication path.

It is not necessary to provide the function of determining duplication of an IP address or cutting a network according to the present invention to an OS in the virtual machine VM and the function is applied to only the host OS of the information processing device 20. Therefore, regardless of the number of virtual machines VM which are operating, the function can be realized in accordance with a simpler method.

According to the functions of determining the duplication of an IP address and cutting the virtualization switch communication path, a worker can connect the information processing device 20 to an existing network without checking an IP address assigned to a virtual machine in the controller in advance. Thus, it is possible to achieve efficient work of the worker connecting the information processing device 20 to the existing network (reduce work necessary for preparation and reduce a psychological burden on the worker).

In the process control system 100, when duplication of an IP address is detected, a worker can be notified of the duplication through the UI 40. Specifically, the UI 40 displays information regarding a duplicated IP address. As a result, it is possible to solve a problem that the worker is unaware of the duplication of the address.

Modification Example

The link monitor 23, the address duplication determiner 24, the address storage 25, the address duplication manager 26, the virtual switch controller 27, and the notifier 28 may be realized by the virtualizer 22. The UI 40 may be included in the information processing device 20.

Second Embodiment

In the first embodiment, it is necessary to register all the IP addresses assigned to the virtual machines VM in the address table in advance. Therefore, a manual effort is required and an error may arise in manual registration of the IP addresses in some cases. Accordingly, in a second embodiment, a configuration in which all the IP addresses assigned to the virtual machines VM are automatically registered in the address table will be described.

Figure 4:
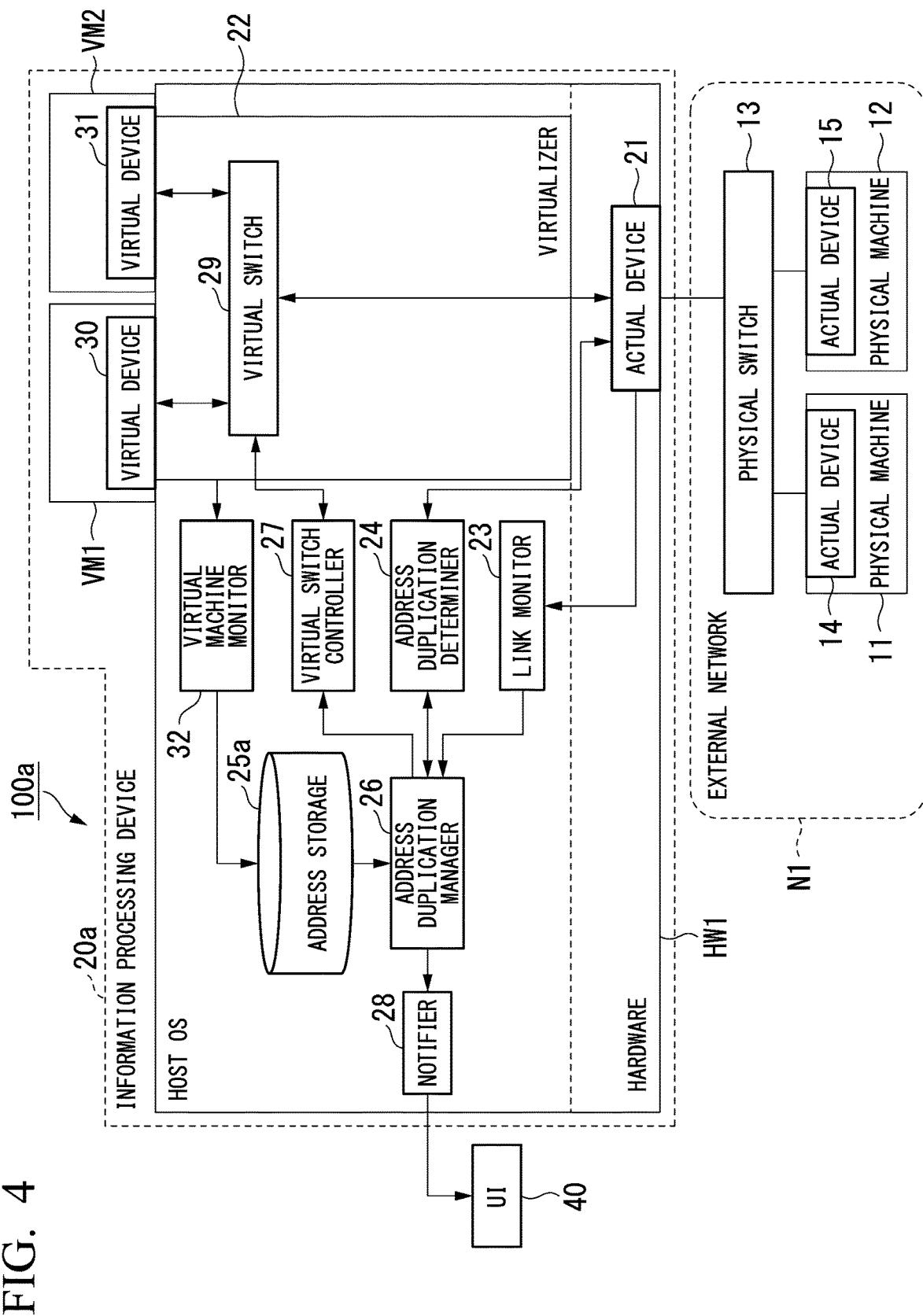
FIG. 4 is a diagram illustrating a system configuration of a process control system according to a second embodiment.

FIG. 4 is a diagram illustrating a system configuration of a process control system 100a according to the second embodiment. The process control system 100a has a different configuration from the process control system 100 in that an information processing device 20a includes an address storage 25a instead of the address storage 25 and newly includes a virtual machine monitor 32. The other configuration of the process control system 100a is similar to that of the process control system 100. Therefore, the description of the entire process control system 100a will be omitted and the address storage 25a and the virtual machine monitor 32 will be described.

The address storage 25a stores information regarding addresses as table (an address table). In the address table stored in the address storage 25a, information regarding IP addresses has not yet been registered when a process starts.

The virtual machine monitor 32 registers the IP addresses of the virtual machines VM (the virtual machines VM1 and VM2) in the address table by acquiring the IP addresses of the virtual machines VM (the virtual machines VM1 and VM2) and writing the acquired IP addresses in the address table. The following two schemes can be exemplified as methods of acquiring the IP addresses of the virtual machines VM (the virtual machines VM1 and VM2) by the virtual machine monitor 32.

(First Scheme)

The host OS detects duplication checking of IPv4 addresses (detects the checking by connection or the like of the host OS to the virtual switch 29) in conformity with the ARP protocol from guest OSs of the virtual machines VM (the virtual machines VM1 and VM2) and the virtual machine monitor 32 acquires the IP addresses and MAC addresses of the virtual machines VM (the virtual machines VM1 and VM2).

(Second Scheme)

The virtual machine monitor 32 acquires the information (for example, the IP addresses) of the virtual machines VM (the virtual machines VM1 and VM2) using a hypervisor function. For example, the virtual machine monitor 32 uses Hyper-V Data Exchange Service or Powershell (registered trademark) commandlet which is a function of an integrated service of Hyper-V (registered trademark).

In the process control system 100a that has the foregoing configuration, it is possible to obtain functions similar to the functions of the first embodiment.

Further, in the process control system 100a, it is not necessary to register the IP addresses of the virtual machines VM in advance in the address table. Accordingly, it is possible to reduce a manual effort and it is possible to reduce a manual registration error of the IP addresses.

Modification Example

The link monitor 23, the address duplication determiner 24, the address storage 25a, the address duplication manager 26, the virtual switch controller 27, the notifier 28, and the virtual machine monitor 32 may be realized by the virtualizer 22.

The UI 40 may be included in the information processing device 20a.

Third Embodiment

In the first and second embodiments, the virtual switch communication path is blocked at the time of duplication of the IP address. Therefore, there is concern of all the virtual machines VM not connectable to the external network N1 in some cases. Accordingly, in a third embodiment, a configuration in which, at the time of duplication of the IP address, a virtual switch communication path is not normally blocked and a communication path between the virtual switch 29 and the virtual machine VM of which the IP address is duplicated (hereinafter referred to as a virtual machine communication path) is blocked or a packet including a duplicated IP address is filtered and blocked will be described.

Figure 5:
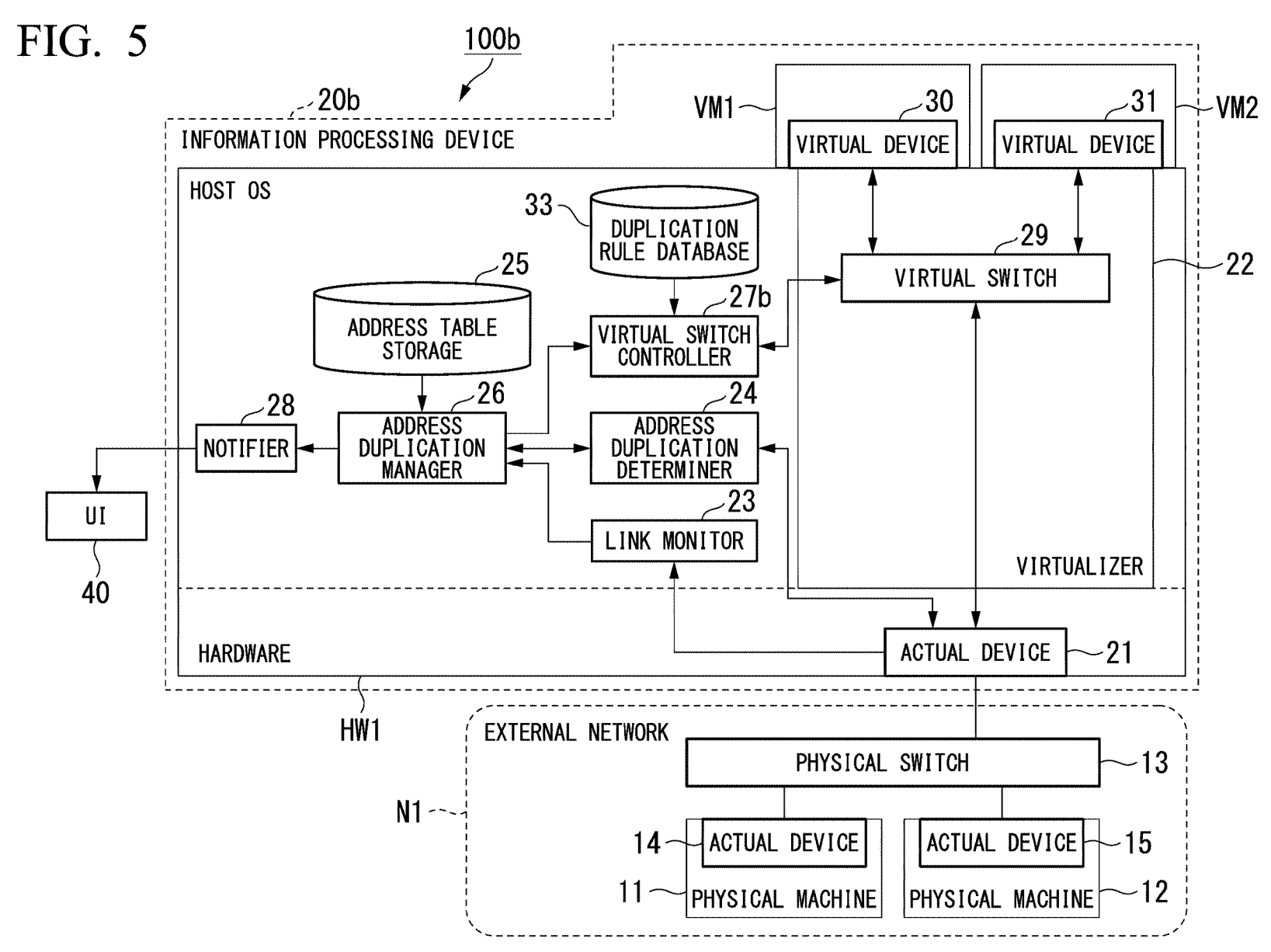

FIG. 5 is a diagram illustrating a system configuration of a process control system 100b according to a third embodiment. The process control system 100b has a different configuration from the process control systems 100 and 100a in that an information processing device 20b newly includes a duplication rule database 33 and includes a virtual switch controller 27b that controls a virtual switch based on a rule. The other configuration of the process control system 100b is similar to those of the process control systems 100 and 100a. Therefore, the description of the entire process control system 100b will be omitted and the duplication rule database 33 and the virtual switch controller 27b according to the embodiment will be described.

The duplication rule database 33 is a database in which a plurality of rules applied are registered when an IP address is duplicated. In the duplication rule database 33, for example, the following three rules are registered:

(1) continuing blocking the virtual switch communication path;
(2) blocking the virtual machine communication path in which the IP address is duplicated; and
(3) filtering a packet including the duplicated IP address.

The rule (1) is a rule in which blocking the virtual switch communication path continues as in the first and second embodiments.

The rule (2) is a rule in which a virtual machine communication path in which an IP address is not duplicated is enabled to perform communication by blocking only the virtual machine communication path in which an IP address is duplicated.

The blocking of communication in accordance with the rules (1) and (2) can be performed in the virtual switch 29, the virtual devices 30 and 31 in the virtual machines VM, the virtual switch communication path, and the virtual machine communication path. Therefore, the blocking is not limited to the virtual switch communication path or the virtual machine communication path and may be performed in the virtual devices 30 and 31 or the virtual switch 29.

The rule (3) is a rule in which a packet including a duplicated IP address is filtered and discarded in the virtual switch communication path. The filtering is performed in the virtual switch 29. Therefore, information regarding an IP address which is a filtering target is registered in the virtual switch 29.

A rule to be applied among the foregoing rules (1) to (3) may be freely selected by the virtual switch controller 27b or may be set in advance. The foregoing rules (1) to (3) may be applied in combination.

The virtual switch controller 27b connects or blocks the virtual switch communication path and the virtual machine communication path by any rule or a combination of the rules (1) to (3) registered in the duplication rule database 33.

Figure 6:
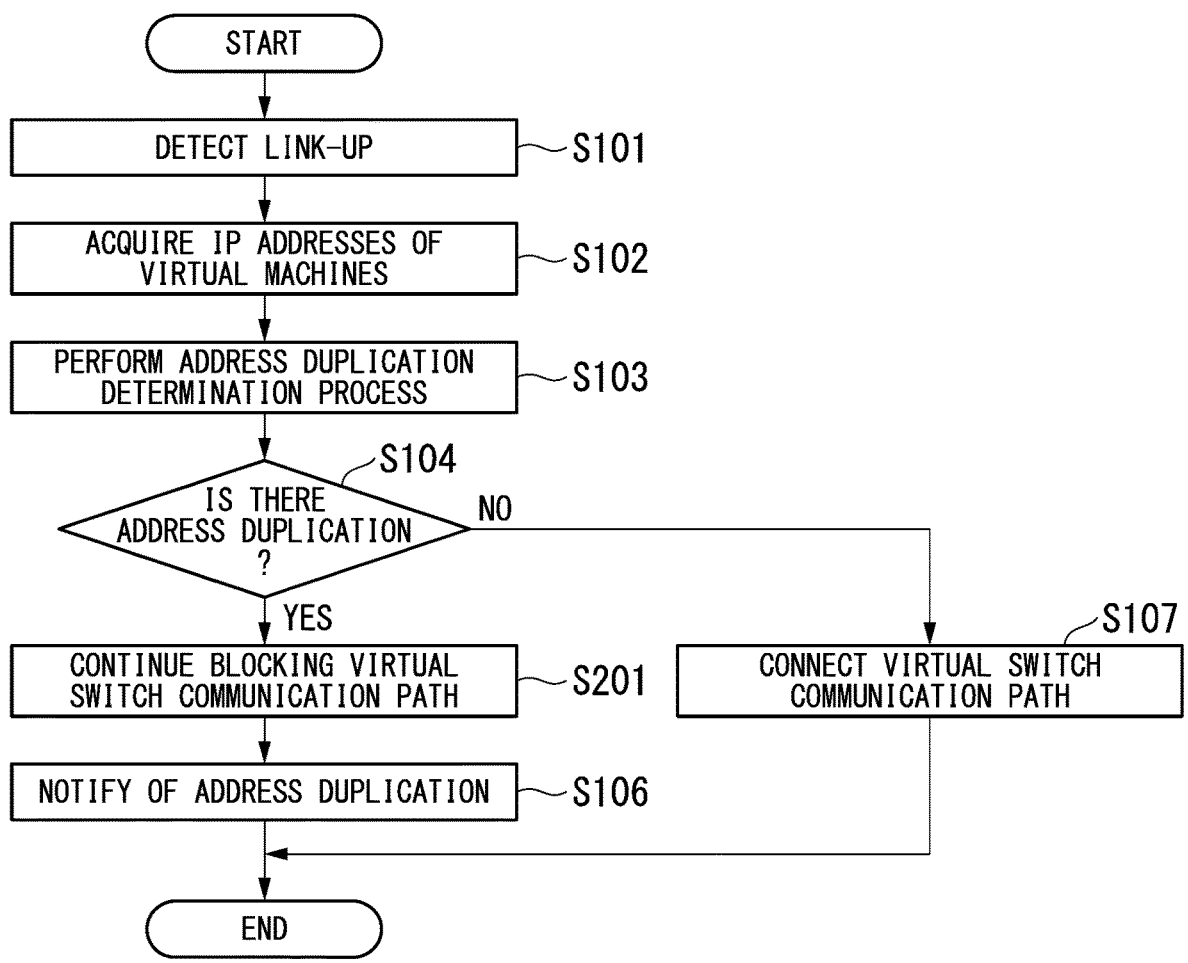
FIG. 6 is a flowchart illustrating a flow of a process of an information processing device according to the third embodiment.

FIG. 6 is a flowchart illustrating a flow of a process of an information processing device 20b according to the third embodiment. When the process of FIG. 6 starts, it is assumed that the actual device 21 is a link-down state and the virtual switch controller 27b blocks the virtual switch communication path. In FIG. 6, similar reference numerals in FIG. 3 are given to processes similar to those of FIG. 3 and the description will be omitted.

When there is the duplication of the IP address (YES in step S104), the address duplication manager 26 notifies the virtual switch controller 27b that the IP address is duplicated. The virtual switch controller 27b performs connection control of the virtual switch communication path and the virtual machine communication path by the rule with reference to the duplication rule database 33 in response to the notification from the address duplication manager 26 (step S201).

Specifically, the virtual switch controller 27b continues blocking the virtual switch communication path without performing anything in the case of the rule (1). In the case of the rule (2), the virtual switch controller 27b enables communication to be performed along the virtual machine communication path in which an IP address is not duplicated by blocking only the virtual machine communication path in which an IP address is duplicated. In the case of rule (3), the virtual switch controller 27b filters and discards a packet including the duplicated IP address in the virtual switch communication path. In the case of a combination of the rules (1) and (2), the virtual switch controller 27b continues blocking the virtual switch communication path and blocks only the virtual machine communication path in which the IP address is duplicated and filters the packet.

In the process control system 100b that has the foregoing configuration, it is possible to obtain functions similar to the functions of the first embodiment.

Further, in the process control system 100b, when the IP address is duplicated as a partial rule at the time of duplication, the virtual switch communication path is not blocked normally, but the virtual machine communication path of which the IP address is duplicated is blocked or a packet including the duplicated IP address is filtered and blocked. Thus, communication between the outside and the virtual machine of which the address is not duplicated is enabled, and thus it is possible to inhibit an influence of the cutting of the network.

Modification Example

The link monitor 23, the address duplication determiner 24, the address storage 25, the address duplication manager 26, the notifier 28, the duplication rule database 33, and the virtual switch controller 27b may be realized by the virtualizer 22.

The UI 40 may be included in the information processing device 20b.

Fourth Embodiment

In a fourth embodiment, the problems arising in the first and second embodiments are solved in accordance with a scheme different from that of the third embodiment. Specifically, in the fourth embodiment, a configuration in which a duplicated IP address is changed so that the IP address is not duplicated when an IP address is duplicated will be described.

Figure 7:
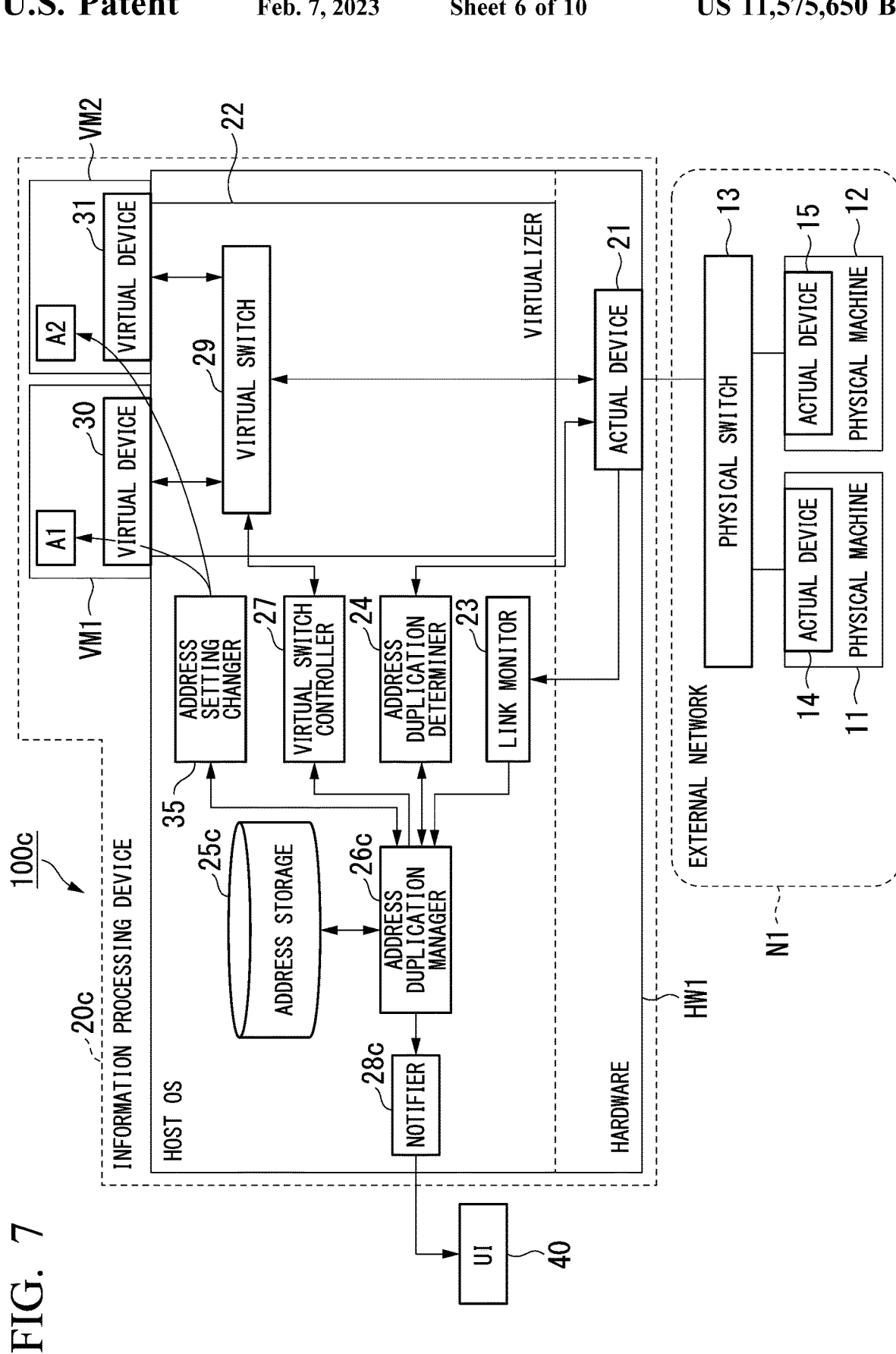
FIG. 7 is a diagram illustrating a system configuration of a process control system according to a fourth embodiment.

FIG. 7 is a diagram illustrating a system configuration of a process control system 100c according to the fourth embodiment. The process control system 100c has a different configuration from those of the other embodiments in that an information processing device 20c includes an address storage 25c, an address duplication manager 26c, and a notifier 28c instead of the address storage 25, the address duplication manager 26, and the notifier 28 and newly includes an address setting changer 35, and the virtual machines VM include virtual machine setting changers (A1 and A2 in FIG. 7). The other configuration of the process control system 100c is similar to those of the other embodiments. Therefore, the description of the entire process control system 100c will be omitted and the address storage 25c, the address duplication manager 26c, the notifier 28c, the address setting changer 35, and the virtual machine setting changers will be described.

The address storage 25c stores information regarding addresses in a table (an address table). IP addresses assigned to at least the virtual machines VM (for example, the virtual machines VM1 and VM2) are registered in the address table.

FIG. 8 is a diagram illustrating an example of an address table according to the fourth embodiment. As illustrated in FIG. 8, assignment information is registered in association with the IP addresses in the address table according to the fourth embodiment. The assignment information is information indicating whether a corresponding IP address is an assigned IP address. An example illustrated in FIG. 8 shows that IP addresses "XXX" and "YYY" are assigned and IP addresses "AAA" and "BBB" has not yet been assigned.

Referring back to FIG. 7, the description of the information processing device 20c will continue.

The address setting changer 35 performs a network setting change such as a change in an IP address, application engineering work (work of changing an application operating on the virtual machine VM to a configuration appropriate for changing an IP address) and reactivation of the virtual machine VM on the virtual machine VM.

The address duplication manager 26c manages duplication of an IP address. Specifically, the address duplication manager 26c causes the address duplication determiner 24 to perform an address duplication determination process of an unassigned IP address registered in the address table.

The notifier 28c notifies the UI 40 of the change in the IP address in addition to a similar process to the notifier 28.

The virtual machine setting changers A1 and A2 change setting of the IP addresses of the own virtual machines VM.

Figure 9:
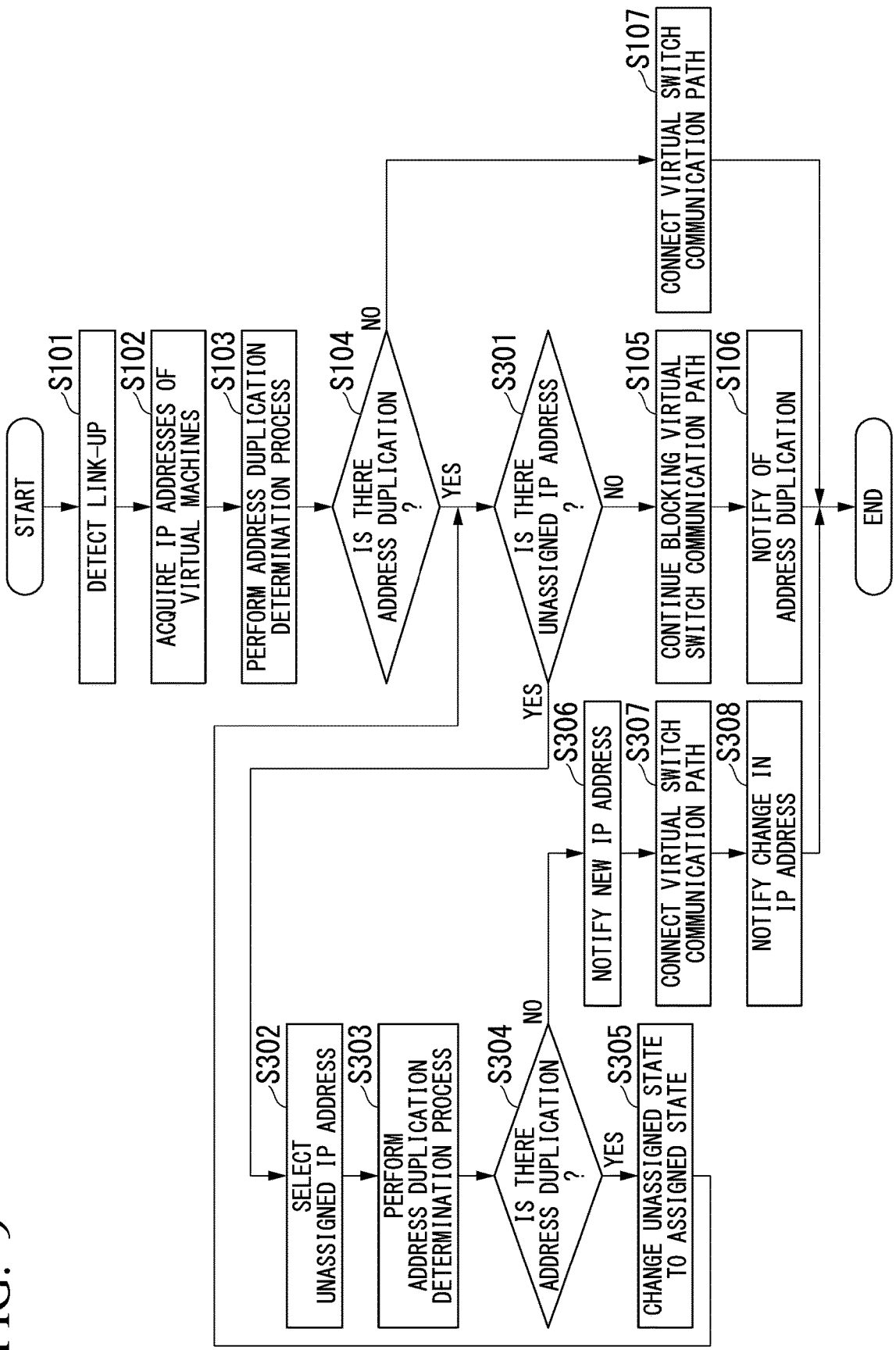
FIG. 9 is a flowchart illustrating a flow of a process of an information processing device according to the fourth embodiment.

FIG. 9 is a flowchart illustrating a flow of a process of the information processing device 20c according to the fourth embodiment. When the process of FIG. 9 starts, it is assumed that the actual device 21 is in a link-down state and the virtual switch controller 27 blocks the virtual switch communication path. In FIG. 9, similar reference numerals in FIG. 3 are given to processes similar to those of FIG. 3 and the description will be omitted.

When there is the duplication of the IP address (YES in step S104), the address duplication manager 26c determines whether there is an unassigned IP address with reference to the address table (step S301). Specifically, when there is a record in which an item of assignment information in the address table is "unassigned," the address duplication manager 26c determines that there is an unassigned IP address. Conversely, when there is no record in which an item of assignment information in the address table is "unassigned," the address duplication manager 26c determines that there is no unassigned IP address.

When there is no unassigned IP address (NO in step S301), the information processing device 20c performs processes subsequent to step S105.

Conversely, when there is an unassigned IP address (YES in step S301), the address duplication manager 26c selects one unassigned IP address registered in the address table (step S302). Specifically, the address duplication manager 26c first selects one record in which the item of the assignment information in the address table is "unassigned." Subsequently, the address duplication manager 26c selects the IP address registered in the item of the IP address of the selected record. When there are a plurality of records in which items are "unassigned," the address duplication manager 26c may select an IP address at random or may select an IP address in sequence.

The address duplication manager 26c instructs the address duplication determiner 24 to determine duplication of the selected IP address. The address duplication determiner 24 performs the address duplication determination process on the selected IP address in response to the instruction from the address duplication manager 26c (step S303). Specifically, the address duplication determiner 24 designates the selected IP address as a target IP and broadcasts an ARP request packet to the external network N1 through the actual device 21.

When there is a reply to the ARP request, the address duplication determiner 24 determines that there is the duplication of the IP address. Conversely, when there is no reply to the ARP request during a timeout period determined in advance immediately after the ARP request packet is broadcast, the address duplication determiner 24 determines that there is no duplication of the IP address. A value of the timeout period is retained in the address duplication manager 26c and the worker can set the value of the timeout period through the UI 40. The address duplication determiner 24 notifies the address duplication manager 26c of a determination result. The address duplication manager 26c obtains information regarding whether there is the duplication of the IP address through the notification of the address duplication determiner 24 (step S304).

When there is the duplication of the IP address (YES in step S304), the address duplication manager 26c changes the item of the assignment information of the selected IP address from the "unassigned state" to the "assigned state" with reference to the address table (step S305). Thereafter, the address duplication manager 26c performs processes subsequent to step S301.

Conversely, when there is no duplicated IP address (NO in step S304), the address duplication manager 26c notifies the address setting changer 35 of a changing target IP address (a duplicated IP address) and a new changed IP address. The address setting changer 35 notifies the virtual machine setting changer A1 on the virtual machine VM (for example, the virtual machine VM1) to which the duplicated IP address is assigned of the information regarding the new changed IP address through the virtual device 30 (step S306). In this way, when the duplication of the unassigned address is not detected as a result of the duplication determination of the unassigned address, the address setting changer 35 sets the unassigned address as an address of the virtual machine VM of which the address is duplicated.

Thus, the virtual machine setting changer A1 changes the setting of the IP address of the own virtual machine VM1. When the change in the setting is completed, the virtual machine setting changer A1 notifies the address setting changer 35 that the change in the setting is completed. The address setting changer 35 notifies the address duplication manager 26c that the change in the setting notified of by the virtual machine setting changer A1 is completed. Thus, the address duplication manager 26c releases the blocking of the virtual switch communication path through the virtual switch controller 27. That is, the virtual switch controller 27 controls the virtual switch 29 such that the virtual switch communication path is connected (step S307). The address duplication manager 26c notifies the UI 40 of the obtained IP address duplication information or IP address changing information through the notifier 28c (step S308).

In the process control system 100c that has the foregoing configuration, it is possible to obtain functions similar to the functions of the first embodiment.

Further, in the process control system 100c, when the duplication of the IP address is detected, the IP address is automatically reset to avoid the duplication of the IP address. Accordingly, it is possible to prevent communication from being not made due to the influence of the duplication of the IP address.

Modification Example

The link monitor 23, the address duplication determiner 24, the address storage 25c, the address duplication manager 26c, the virtual switch controller 27, the notifier 28c, and the address setting changer 35 may be realized by the virtualizer 22. The UI 40 may be included in the information processing device 20c.

The process of changing the setting of the IP address of the virtual machine VM according to the fourth embodiment may be performed in the second and third embodiments.

Fifth Embodiment

When the address setting changer 35 can change the IP addresses of the virtual machines VM through the virtual device as in the fourth embodiment, there is a risk of changing the IP address from an external network device, and thus there is a security problem. Accordingly, in a fifth embodiment, a configuration in which a change in an IP address is performed relatively safely by performing communication using a dedicated communication path between the host OS and the virtual machine VM will be described. For example, in Hyper-V, the configuration can be realized using a virtual machine VM socket. Here, when the host OS performs direct communication with the virtual machine VM, an ID (a virtual machine name or the like) used for the host OS to recognize the virtual machine VM is necessary.

Figure 10:
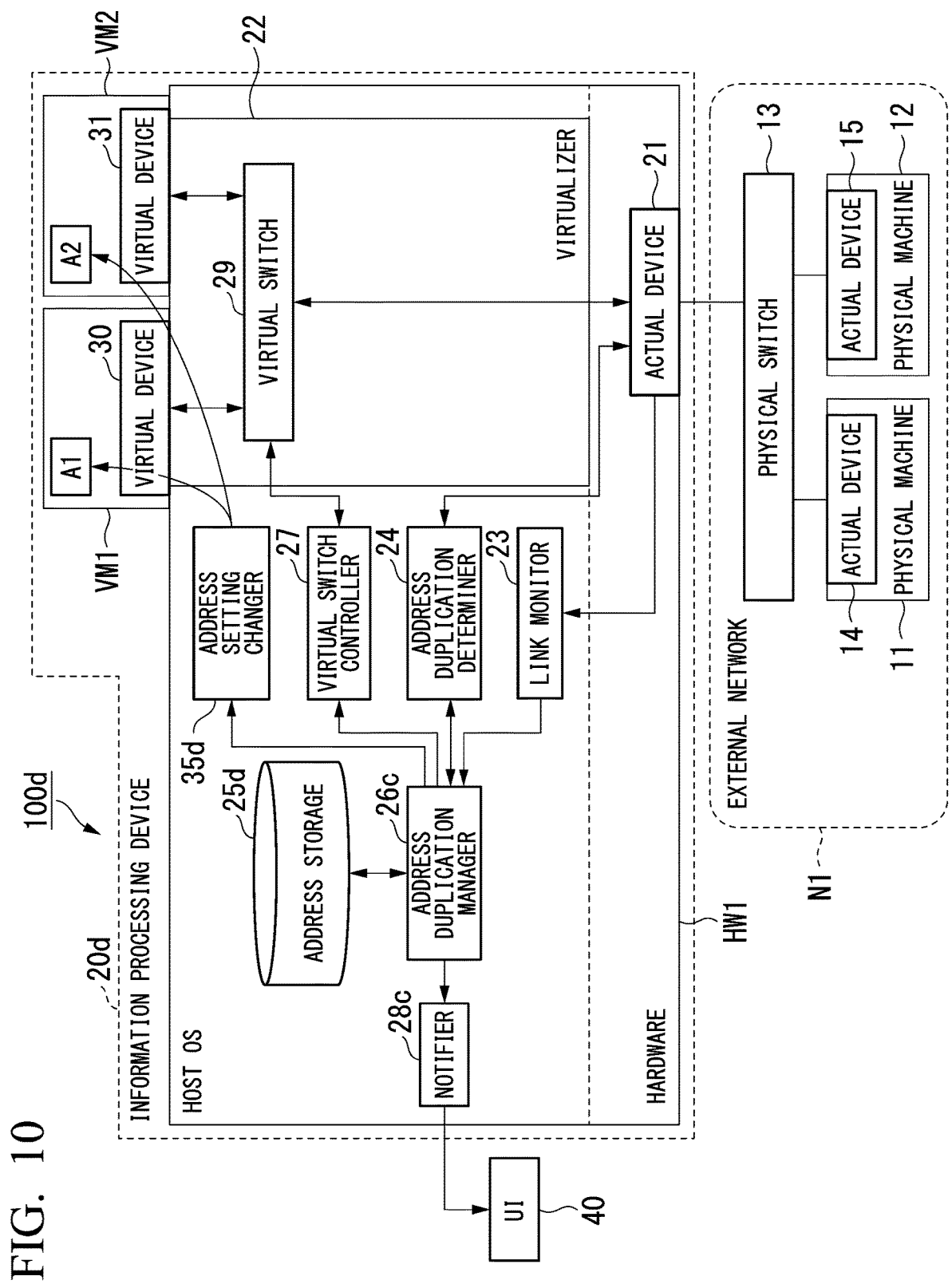
FIG. 10 is a diagram illustrating a system configuration of a process control system according to a fifth embodiment.

FIG. 10 is a diagram illustrating a system configuration of a process control system 100d according to the fifth embodiment. The process control system 100d has a different configuration from the process control system 100c in that an information processing device 20d includes an address storage 25d and an address setting changer 35d instead of the address storage 25c and the address setting changer 35. The other configuration of the process control system 100d is similar to those of the process control system 100c. Therefore, the description of the entire process control system 100d will be omitted and the address storage 25d and the address setting changer 35d according to the embodiment will be described.

The address storage 25d stores information regarding addresses in a table (an address table). IP addresses assigned to at least the virtual machines VM (for example, the virtual machines VM1 and VM2) are registered in the address table.

FIG. 11 is a diagram illustrating an example of an address table according to the fifth embodiment. As illustrated in FIG. 11, IDs, IP addresses, and assignment information are registered in the address table according to the fifth embodiment. The ID is information used to uniquely identify the virtual machine VM. For example, the ID may be the name of the virtual machine VM. The example illustrated in FIG. 11 shows that an IP address "XXX" is assigned to the ID "virtual machine VM1."

Referring back to FIG. 10, the description of the information processing device 20d will continue.

The address setting changer 35d performs a network setting change such as a change in an IP address, application engineering work (work of changing an application operating on the virtual machine VM to a configuration appropriate for changing an IP address) and reactivation of the virtual machine VM on the virtual machine VM identified with the ID based on the ID registered in the address table.

In the process control system 100d that has the foregoing configuration, when the IP address is changed, the IP address of the virtual machine VM is changed using the dedicated communication path between the host OS and the virtual machine VM. Thus, the change in the IP address can be performed relatively safely.

Modification Example

The link monitor 23, the address duplication determiner 24, the address storage 25d, the address duplication manager 26, the virtual switch controller 27, the notifier 28c, and the address setting changer 35d may be realized by the virtualizer 22.

The UI 40 may be included in the information processing device 20d.

Modification Example Common to First to Fifth Embodiments

The number of physical machines included in the process control systems 100 to 100d is not limited.

The number of virtual machines included in the process control systems 100 to 100d is not limited.

[Supplementary Note]

According to an aspect of the present invention, an information processing device (20) includes: a virtualizer (22) configured to operate as a proxy of hardware (HW1) on the hardware (HW1); at least one virtual machine (VM1, VM2) configured to function as a part of a process control system on the virtualizer; an address duplication determiner (24) configured to determine duplication of an address on an external network (N1) when the external network is connected to the hardware; and an address duplication manager (26, 26c) configured to cut a connection between the virtual machine and the external network when the duplication of the address is detected.

In the foregoing configuration, the information processing device determines the duplication of the address of the virtual machine when the hardware is connected to an existing external network. When the address is determined to be duplicated as a result of the determination of the duplication of the address, the information processing device cuts connection between an external network and a virtual machine. Thus, no communication with the outside is made when the address is duplicated. Therefore, it is possible to reduce an influence of address duplication occurring when the virtualization server is connected to the existing external network.

In the information processing device according to the aspect of the present invention, the address duplication manager may connect the virtual machine to the external network to be capable of communicating with each other when the duplication of the address is not detected.

In the foregoing configuration, the virtual machine can communicate with a newly connected external network.

The information processing device according to the aspect of the present invention may further include a virtual machine monitor (32) configured to acquire an address of the virtual machine. The address duplication determiner may determine the duplication of the address acquired by the virtual machine monitor.

In the foregoing configuration, even when an address of the virtual machine is unknown, the address of the virtual machine can be acquired. Thus, even when the address of the virtual machine is not registered, address duplication determination can be performed. Accordingly, it is not necessary to register the address of the virtual machine in advance. Therefore, it is possible to reduce a burden necessary to register the address.

The information processing device according to the aspect of the present invention may further include a virtual switch controller (27, 27b) configured to block or filter communication between the virtual machine and the external network of which addresses are duplicated to cut the communication between the virtual machine and the external network of which the addresses are duplicated.

In the foregoing configuration, when the address is duplicated, communication between the virtual machine and the external network of which addresses are duplicated is blocked or packets including the duplicated addresses are filtered to be blocked. Thus, communication between the outside and the virtual machine of which the address is not duplicated is enabled, and thus it is possible to inhibit an influence of the cutting of the network.

The information processing device according to the aspect of the present invention may further include an address setting changer (35, 35d) configured to change the address of the virtual machine of which the address is duplicated. The address duplication determiner may determine duplication of an unassigned address on the external network to determine whether the unassigned address has already been used. The address setting changer may set the unassigned address as an address of the virtual machine of which the address is duplicated when the duplication of the address is not detected as a result of the determination of the duplication of the unassigned address.

In the foregoing configuration, when the duplication of the address is detected, the duplication of an unassigned address is determined again. When the unassigned address is not duplicated, the unassigned address is reset for the virtual machine to avoid the duplication of the address. Accordingly, it is possible to prevent communication from not being made due to the influence of the duplication of the address.

The information processing device according to the aspect of the present invention may further include a notifier (28, 28c) configured to notify an outside that the duplication of the address is detected.

In the foregoing configuration, when the duplication of the address is detected, the worker can be notified of the duplication of the address. As a result, it is possible to solve a problem that the worker is unaware of the duplication of the address.

The information processing device according to the aspect of the present invention may further include a link monitor (23) configured to detect that the external network is connected to the hardware. The address duplication manager may instruct the address duplication determiner to determine the duplication of the address when the link monitor has detected that the external network is connected to the hardware.

According to another aspect of the present invention, an address duplication managing method performed by an information processing device that includes a virtualizer configured to operate as a proxy of hardware on the hardware and at least one virtual machine configured to function as a part of a process control system on the virtualizer, the address duplication managing method includes: determining, by an address duplication determiner, duplication of an address on an external network when the external network is connected to the hardware; and cutting, by an address duplication manager, a connection between the virtual machine and the external network when the duplication of the address is detected.

The address duplication managing method according to the aspect of the present invention may further include: connecting, by the address duplication manager, the virtual machine to the external network to be capable of communicating with each other when the duplication of the address is not detected.

The address duplication managing method according to the aspect of the present invention may further include: acquiring, by a virtual machine monitor, an address of the virtual machine; and determining, by the address duplication determiner, the duplication of the address acquired by the virtual machine monitor.

The address duplication managing method according to the aspect of the present invention may further include: blocking or filtering, by a virtual switch controller, communication between the virtual machine and the external network of which addresses are duplicated to cut the communication between the virtual machine and the external network of which the addresses are duplicated.

The address duplication managing method according to the aspect of the present invention may further include: changing, by an address setting changer, the address of the virtual machine of which the address is duplicated; determining, by the address duplication determiner, duplication of an unassigned address on the external network to determine whether the unassigned address has already been used; and setting, by the address setting changer, the unassigned address as an address of the virtual machine of which the address is duplicated when the duplication of the address is not detected as a result of the determination of the duplication of the unassigned address.

The address duplication managing method according to the aspect of the present invention may further include: notifying, by a notifier, an outside that the duplication of the address is detected.

The address duplication managing method according to the aspect of the present invention may further include: detecting, by a link monitor, that the external network is connected to the hardware; and instructing, by the address duplication manager, the address duplication determiner to determine the duplication of the address when the link monitor has detected that the external network is connected to the hardware.

According to another aspect of the present invention, a non-transitory computer readable storage medium storing one or more programs configured for execution by an information processing device that includes a virtualizer configured to operate as a proxy of hardware on the hardware and at least one virtual machine configured to function as a part of a process control system on the virtualizer, the one or more programs including instructions for: determining, by an address duplication determiner, duplication of an address on an external network when the external network is connected to the hardware; and cutting, by an address duplication manager, a connection between the virtual machine and the external network when the duplication of the address is detected.

In the non-transitory computer readable storage medium according to the aspect of the present invention, the one or more programs may further include instructions for: connecting, by the address duplication manager, the virtual machine to the external network to be capable of communicating with each other when the duplication of the address is not detected.

In the non-transitory computer readable storage medium according to the aspect of the present invention, the one or more programs may further include instructions for: acquiring, by a virtual machine monitor, an address of the virtual machine; and determining, by the address duplication determiner, the duplication of the address acquired by the virtual machine monitor.

In the non-transitory computer readable storage medium according to the aspect of the present invention, the one or more programs may further include instructions for: blocking or filtering, by a virtual switch controller, communication between the virtual machine and the external network of which addresses are duplicated to cut the communication between the virtual machine and the external network of which the addresses are duplicated.

In the non-transitory computer readable storage medium according to the aspect of the present invention, the one or more programs may further include instructions for: changing, by an address setting changer, the address of the virtual machine of which the address is duplicated; determining, by the address duplication determiner, duplication of an unassigned address on the external network to determine whether the unassigned address has already been used; and setting, by the address setting changer, the unassigned address as an address of the virtual machine of which the address is duplicated when the duplication of the address is not detected as a result of the determination of the duplication of the unassigned address.

In the non-transitory computer readable storage medium according to the aspect of the present invention, the one or more programs may further include instructions for: notifying, by a notifier, an outside that the duplication of the address is detected.

In the non-transitory computer readable storage medium according to the aspect of the present invention, the one or more programs may further include instructions for: detecting, by a link monitor, that the external network is connected to the hardware; and instructing, by the address duplication manager, the address duplication determiner to determine the duplication of the address when the link monitor has detected that the external network is connected to the hardware.

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the present invention should be interpreted relative to a device equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. An information processing device comprising:
   a virtualizer configured to operate as a proxy of hardware on the hardware;
   at least one virtual machine configured to function as a part of a process control system on the virtualizer, the at least one virtual machine having an address set thereto;
   a virtual switch controller configured to connect the virtual machine and an external network connected to the hardware to be capable of communicating with each other or disconnect the virtual machine and the external network to be incapable of communicating with each other;
   an address duplication determiner configured to: when the external network is newly connected to the hardware, while the at least one virtual machine and the external network continue to be disconnected to be incapable of communicating with each other,
      broadcast the address of the at least one virtual machine to the external network;
      determine that there is a duplication of the address when there is a reply from the external network during a predetermined period after broadcasting the address; and
      determine that there is no duplication of the address when there is no reply from the external network during the predetermined period; and
   an address duplication manager configured to cause the virtual switch controller to continue disconnecting at least virtual machine with the duplication of the address, among the at least one virtual machine, and the external network to be incapable of communicating with each other when the duplication of the address is detected.

2. The information processing device according to claim 1,
   wherein the address duplication manager connects the virtual machine to the external network to be capable of communicating with each other when the duplication of the address is not detected.

3. The information processing device according to claim 1, further comprising:
   a virtual machine monitor configured to acquire an address of the virtual machine,
   wherein the address duplication determiner determines the duplication of the address acquired by the virtual machine monitor.

4. The information processing device according to claim 1,
   wherein the virtual switch controller is configured to block or filter communication between the virtual machine and the external network of which addresses are duplicated to cut the communication between the virtual machine and the external network of which the addresses are duplicated.

5. The information processing device according to claim 1, further comprising:
   an address setting changer configured to change the address of the virtual machine of which the address is duplicated, wherein the address duplication determiner determines duplication of an unassigned address on the external network to determine whether the unassigned address has already been used, and wherein the address setting changer sets the unassigned address as an address of the virtual machine of which the address is duplicated when the duplication of the address is not detected as a result of the determination of the duplication of the unassigned address.

6. The information processing device according to claim 1, further comprising:
a notifier configured to notify an outside that the duplication of the address is detected.

7. The information processing device according to claim 1, further comprising:
a link monitor configured to detect that the external network is connected to the hardware,
wherein the address duplication manager instructs the address duplication determiner to determine the duplication of the address when the link monitor has detected that the external network is connected to the hardware.

8. An address duplication managing method performed by an information processing device that comprises a virtualizer configured to operate as a proxy of hardware on the hardware and at least one virtual machine configured to function as a part of a process control system on the virtualizer, the at least one virtual machine having an address set thereto, the address duplication managing method comprising:
using a virtual switch controller configured to connect the virtual machine and an external network connected to the hardware to be capable of communicating with each other or disconnect the virtual machine and the external network to be incapable of communicating with each other;
when the external network is newly connected to the hardware, while the at least one virtual machine and the external network continue to be disconnected to be incapable of communicating with each other, broadcasting, by an address duplication determiner, the address of the at least one virtual machine to an external network;
determining, by the address duplication determiner, that there is a duplication of the address when there is a reply from the external network during a predetermined period after broadcasting the address; and
determining, by the address duplication determiner, that there is no duplication of the address when there is no reply from the external network during the predetermined period; and
causing, by an address duplication manager, the virtual switch controller to continue disconnecting at least virtual machine with the duplication of the address, among the at least one virtual machine, and the external network to be incapable of communicating with each other when the duplication of the address is detected.

9. The address duplication managing method according to claim 8, further comprising:
connecting, by the address duplication manager, the virtual machine to the external network to be capable of communicating with each other when the duplication of the address is not detected.

10. The address duplication managing method according to claim 8, further comprising:
acquiring, by a virtual machine monitor, an address of the virtual machine; and determining, by the address duplication determiner, the duplication of the address acquired by the virtual machine monitor.

11. The address duplication managing method according to claim 8, further comprising:
blocking or filtering, by the virtual switch controller, communication between the virtual machine and the external network of which addresses are duplicated to cut the communication between the virtual machine and the external network of which the addresses are duplicated.

12. The address duplication managing method according to claim 8, further comprising:
changing, by an address setting changer, the address of the virtual machine of which the address is duplicated;
determining, by the address duplication determiner, duplication of an unassigned address on the external network to determine whether the unassigned address has already been used; and
setting, by the address setting changer, the unassigned address as an address of the virtual machine of which the address is duplicated when the duplication of the address is not detected as a result of the determination of the duplication of the unassigned address.

13. The address duplication managing method according to claim 8, further comprising:
notifying, by a notifier, an outside that the duplication of the address is detected.

14. The address duplication managing method according to claim 8, further comprising:
detecting, by a link monitor, that the external network is connected to the hardware; and
instructing, by the address duplication manager, the address duplication determiner to determine the duplication of the address when the link monitor has detected that the external network is connected to the hardware.

15. A non-transitory computer readable storage medium storing one or more programs configured for execution by an information processing device that comprises a virtualizer configured to operate as a proxy of hardware on the hardware and at least one virtual machine configured to function as a part of a process control system on the virtualizer, the at least one virtual machine having an address set thereto, the one or more programs comprising instructions for:
using a virtual switch controller configured to connect the virtual machine and an external network connected to the hardware to be capable of communicating with each other or disconnect the virtual machine and the external network to be incapable of communicating with each other;
when the external network is newly connected to the hardware, while the at least one virtual machine and the external network continue to be disconnected to be incapable of communicating with each other, broadcasting, by an address duplication determiner, the address of the at least one virtual machine to an external network;
determining, by the address duplication determiner, that there is a duplication of the address when there is a reply from the external network during a predetermined period after broadcasting the address; and
determining, by the address duplication determiner, that there is no duplication of the address when there is no reply from the external network during the predetermined period; and causing, by an address duplication manager, the virtual switch controller to continue disconnecting at least virtual machine with the duplication of the address, among the at least one virtual machine, and the external network to be incapable of communicating with each other when the duplication of the address is detected.

16. The non-transitory computer readable storage medium according to claim 15, wherein the one or more programs further comprise instructions for:

connecting, by the address duplication manager, the virtual machine to the external network to be capable of communicating with each other when the duplication of the address is not detected.

17. The non-transitory computer readable storage medium according to claim 15, wherein the one or more programs further comprise instructions for:

acquiring, by a virtual machine monitor, an address of the virtual machine; and determining, by the address duplication determiner, the duplication of the address acquired by the virtual machine monitor.

18. The non-transitory computer readable storage medium according to claim 15, wherein the one or more programs further comprise instructions for:

blocking or filtering, by the virtual switch controller, communication between the virtual machine and the external network of which addresses are duplicated to cut the communication between the virtual machine and the external network of which the addresses are duplicated.

19. The non-transitory computer readable storage medium according to claim 15, wherein the one or more programs further comprise instructions for:

changing, by an address setting changer, the address of the virtual machine of which the address is duplicated;

determining, by the address duplication determiner, duplication of an unassigned address on the external network to determine whether the unassigned address has already been used; and setting, by the address setting changer, the unassigned address as an address of the virtual machine of which the address is duplicated when the duplication of the address is not detected as a result of the determination of the duplication of the unassigned address.

20. The non-transitory computer readable storage medium according to claim 15, wherein the one or more programs further comprise instructions for:

notifying, by a notifier, an outside that the duplication of the address is detected.

* * * * *